Sept. 9, 1924. 1,508,254
J. K. RUTHS
APPARATUS FOR AND METHOD OF CONTROLLING THE WATER LEVEL IN
STEAM ACCUMULATORS
Filed Dec. 4, 1919
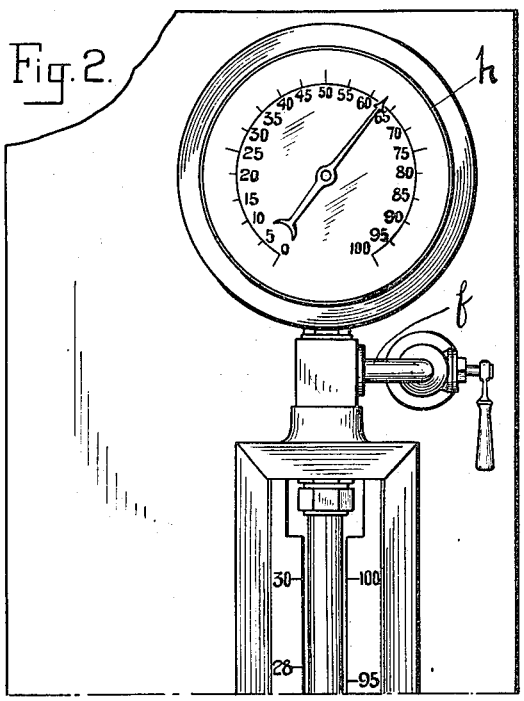
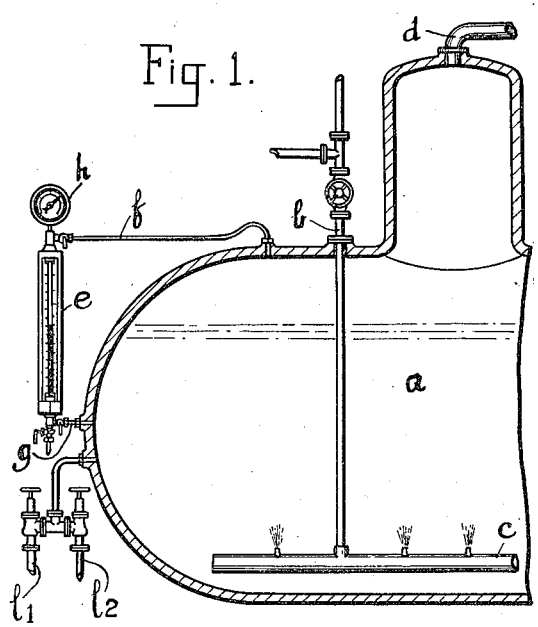
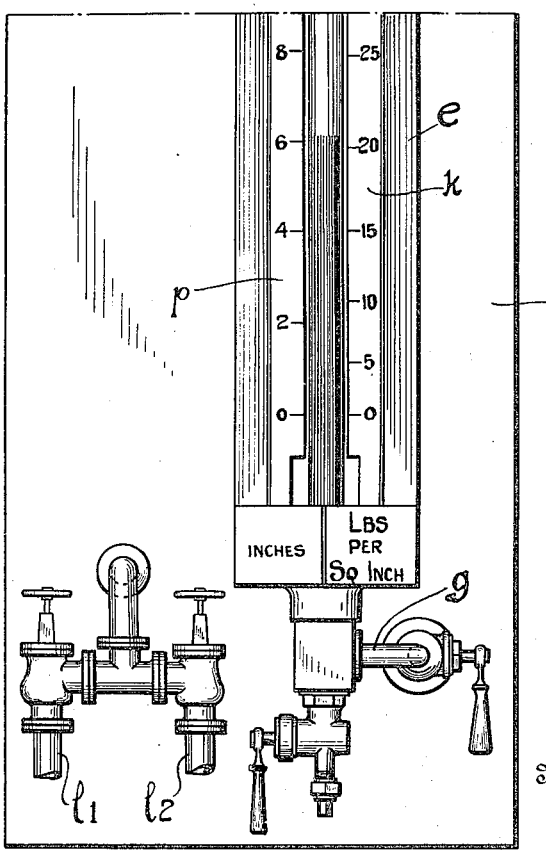
Inventor
JOHANNES KARL RUTHS
By
Attorney Patented Sept. 9, 1924.

1,508,254

UNITED STATES PATENT OFFICE.

JOHANNES KARL RUTHS, OF DJURSHOLM, SWEDEN, ASSIGNOR TO AKTIEBOLAGET VAPORACKUMULATOR, OF STOCKHOLM, SWEDEN, A CORPORATION.

APPARATUS FOR AND METHOD OF CONTROLLING THE WATER LEVEL IN STEAM ACCUMULATORS.

Application filed December 4, 1919. Serial No. 342,472.

*To all whom it may concern:*

Be it known that I, JOHANNES KARL RUTHS, subject of the King of Sweden, residing at Djursholm, in the Kingdom of Sweden, have invented certain new and useful Improvements in Apparatus for and Methods of Controlling the Water Level in Steam Accumulators, of which the following is a specification.

In steam plants provided with steam accumulators, partly filled with a liquid such as water, certain drawbacks make it difficult to attain a satisfactory control of the water level of the accumulator. Such a control is, however, necessary, because such steam accumulators are generally designed for greatly varying pressures which are accompanied by exceedingly great variations in the water level. Besides, the specific volume of the water in a completely charged accumulator and at the maximum temperature of the water is considerably larger than in a discharged accumulator.

My invention has for its object to make it possible at all times to calculate the water level for the normal position, and this independently of the condition of charge of the accumulator for the time being.

The present invention consists in the combination with a steam accumulator, of a pressure gauge of any desired or known form, adapted to indicate the momentary pressure in the accumulator, a water column showing the water level in the accumulator, a scale for said water column, pressure graduations on said scale, said pressure graduations indicating the pressure normally corresponding to each water level, these parts being so arranged that by comparing the reading of the pressure gauge and the graduation on the scale opposite the momentary water level, the deviation from normal relativity of pressure and water level may be determined and the level of water in the accumulator changed accordingly.

My invention consists also in the method of controlling the water level in accumulators as herein set forth.

An embodiment of the invention is illustrated in the accompanying drawing in which Fig. 1 shows a steam accumulator with the apparatus for ascertaining the condition of the water level and changing the water level attached thereto and Fig. 2 shows the apparatus on enlarged scale.

In Fig. 1, $a$, denotes the insulated steam accumulator, and $b$, is a steam supply pipe leading to the pipe $c$ which is located beneath the lowermost water level; $d$ designates a discharge pipe for steam.

$e$ denotes the water level indicator or water column communicating with the inside of the accumulator by means of the pipes $f$ and $g$. $l_1$ is a water supply conduit, which in most cases is preferably branched off from the feed water piping of the boilers, while $l_2$ designates an outlet conduit preferably leading to the feed water reservoir. $h$ is a pressure gauge of ordinary type, operated by the pressure in the accumulator to indicate the momentary pressure therein. Both conduits are provided with cocks whereby the quantity of water can be regulated.

In Fig. 2, $m$ designates the shell of the accumulator or a panel on which the apparatus is mounted. The indicator $e$ has two scales, one of which indicates pressure and is graduated in pounds per square inch, as shown at $k$, whereas the other scale $p$ indicates the water content of the accumulator and is graduated in inches. It is obvious that the pressure scale $k$ may be graduated in atmospheres and the scale $p$ in cubic inches, cubic centimeters or the like.

The object of the invention will be clearly understood from the following description:

In certain cases the water level in the accumulator may fall a little after a charging and a discharging operation, the case, for instance, where the accumulator is fed with superheated steam while dry or wet steam is being drawn off. On the other hand the water level rises due to part of the steam being condensed in the accumulator corresponding to the losses due to the cooling of the latter. Accordingly, as the former or the latter condition is predominant, the water level in the accumulator can have a falling or a rising tendency causing deviation from the water level corresponding to the momentary pressure in the accumulator. This deviation from the normal water level corresponding to a certain pressure may exceed the permissible limit. This is shown by the fact that the value read off at the water level on the pressure scale of the water level indicator does not correspond to the value read off on the pressure gauge. In that case a corresponding quantity of water must either be supplied through the piping $l_1$ or discharged through the piping $l_2$ so that the pressure numeral indicated by the water level corresponds exactly to the momentary pressure indicated by the pressure gauge.

As will be seen, this arrangement at all times allows of an adjustment to normal water level independently of the charging condition of the accumulator by comparing the reading of the pressure operated gauge $h$ with the graduation shown at the right of Fig. 2 opposite the momentary water level and introducing water into or withdrawing water from the accumulator, until the two pressure readings, the one on the pressure gauge $h$, and the other on the water column $e$ correspond. Obviously, the water level indicator $e$ may comprise two such instruments, each carrying one scale or one instrument alone may be used graduated only in pressure.

I claim:

1. In a steam accumulator wherein the pressure varies between wide limits and in which there is a different water level corresponding to each pressure, the combination of a pressure operated gauge adapted to indicate the momentary pressure in the accumulator, a water column showing the water level in the accumulator, a scale for said water column having pressure graduations thereon, said pressure graduations indicating the pressure normally corresponding to each water level, so that by comparing the momentary reading of the pressure operated gauge and the graduation on the scale opposite the momentary water level, the deviation from normal relativity of pressure and water level may be obtained.

2. The method of controlling the water level in an accumulator which comprises indicating the actual water level in the accumulator, indicating the actual pressure in the accumulator, indicating the normal pressure corresponding to the actual water level, and supplying water to the accumulator or discharging water therefrom until the actual pressure is equal to the normal pressure corresponding to the actual water level.

3. The method of controlling the water level in an accumulator which comprises indicating the actual water level in the accumulator, indicating the actual pressure in the accumulator, indicating the normal water level corresponding to the actual pressure, and supplying water to the accumulator or discharging water therefrom until the actual water level indicates a value equal to that of the normal water level corresponding to the actual pressure.

4. An accumulator, means to indicate the actual water level in the accumulator, means to indicate the actual pressure in the accumulator, means to indicate the normal pressure corresponding to the actual water level, means to supply water to the accumulator or discharge water therefrom so that the normal pressure corresponding to the actual water level may have the same value as the actual pressure.

5. An accumulator, means to indicate the actual water level in the accumulator, means to indicate the actual pressure in the accumulator, means to indicate the normal water level corresponding to the actual pressure, means to alter the water content of the accumulator so that the actual water level may be made to indicate a value equal to that of the normal water level corresponding to the actual pressure.

In testimony whereof I affix my signature, in presence of two witnesses.

JOHANNES KARL RUTHS.

Witnesses:
FRITZ E. HALLIN,
P. H. BERGROTH.